United States Patent
Bretschneider

(10) Patent No.: US 10,365,627 B2
(45) Date of Patent: Jul. 30, 2019

(54) PROCESSING MACHINE WHICH TAKES INTO ACCOUNT POSITION ERRORS DURING COLLISION CHECKING

(71) Applicant: SIEMENS AKTIENGESELLSCHAFT, München (DE)

(72) Inventor: Jochen Bretschneider, Esslingen (DE)

(73) Assignee: Siemens Aktiengesellschaft, München (DE)

( * ) Notice: Subject to any disclaimer, the term of this patent is extended or adjusted under 35 U.S.C. 154(b) by 483 days.

(21) Appl. No.: 14/657,634

(22) Filed: Mar. 13, 2015

(65) Prior Publication Data

US 2015/0261201 A1    Sep. 17, 2015

(30) Foreign Application Priority Data

Mar. 14, 2014  (EP) ..................................... 14159692

(51) Int. Cl.
  *G05B 19/4061* (2006.01)
  *G05B 19/19* (2006.01)

(52) U.S. Cl.
  CPC ......... *G05B 19/19* (2013.01); *G05B 19/4061* (2013.01); *G05B 2219/41439* (2013.01); *G05B 2219/49148* (2013.01); *G05B 2219/49157* (2013.01); *G05B 2219/49198* (2013.01)

(58) Field of Classification Search
  CPC ................ G05B 19/19; G05B 19/4061; G05B 2219/41439; G05B 2219/49148; G05B 2219/49157; G05B 2219/49198
  See application file for complete search history.

(56) References Cited

U.S. PATENT DOCUMENTS

| 5,105,368 A | 4/1992 | Flemming | |
| 6,535,788 B1 * | 3/2003 | Yoshida | G05B 19/40931 700/191 |
| 6,539,274 B1 * | 3/2003 | Rauth | G05B 19/404 409/238 |

(Continued)

FOREIGN PATENT DOCUMENTS

| DE | 10321241 A1 | 12/2004 |
| EP | 1531374 A2 | 5/2005 |

*Primary Examiner* — Brian W Wathen
*Assistant Examiner* — Brian T McMenemy
(74) *Attorney, Agent, or Firm* — Henry M. Feiereisen LLC

(57) ABSTRACT

A numerical controller of a processing machine determines corresponding setpoint axis values based on setpoint position values for position-regulated axes operating on machine elements. Before controlling the position-regulated axes, volumes to be occupied by protection bodies associated with the machine elements, a workpiece and a tool are defined and it is checked whether the protection bodies remain disjoint while controlling the position-regulated axes. Depending on the result of the checks, the controller either controls the position-regulated axes in accordance with the setpoint position values or merely executes an error response without control. The controller contains a position error field which specifies for any given setpoint axis value an actual position the tool relative to the workpiece. The position error field is taken into consideration, at least for a subset of the protection bodies, when defining the volumes to be occupied by the protection bodies upon activation of the position-regulated axes.

13 Claims, 6 Drawing Sheets

(56) References Cited

U.S. PATENT DOCUMENTS

| | | | |
|---|---|---|---|
| 7,570,006 B2 | 8/2009 | Bretschneider | |
| 7,988,606 B2 | 8/2011 | Bretschneider | |
| 8,322,698 B2 | 12/2012 | Bretschneider | |
| 9,063,536 B2* | 6/2015 | Otsuki | G05B 19/4086 |
| 9,524,583 B2* | 12/2016 | Montana | G06T 19/00 |
| 2002/0126297 A1* | 9/2002 | Wang | B23Q 17/22 356/614 |
| 2009/0102410 A1 | 4/2009 | Bretschneider | |
| 2009/0164038 A1 | 6/2009 | Bretschneider | |
| 2009/0222306 A1 | 9/2009 | Bretschneider | |
| 2010/0138018 A1 | 6/2010 | Bretschneider | |
| 2010/0174410 A1* | 7/2010 | Greer | B25J 9/1671 700/264 |
| 2011/0316335 A1 | 12/2011 | Bretschneider | |
| 2012/0004760 A1* | 1/2012 | Bonerz | B23Q 17/2208 700/178 |
| 2013/0139397 A1* | 6/2013 | Jordil | G01B 21/047 33/503 |
| 2014/0156052 A1* | 6/2014 | Nishibashi | G05B 19/4103 700/112 |
| 2015/0039122 A1* | 2/2015 | Barakchi Fard | G06F 17/5009 700/186 |
| 2015/0088301 A1* | 3/2015 | Erdim | G05B 19/18 700/190 |

\* cited by examiner

PROCESSING MACHINE WHICH TAKES INTO ACCOUNT POSITION ERRORS DURING COLLISION CHECKING

CROSS-REFERENCES TO RELATED APPLICATIONS

This application claims the priority of European Patent Application, Serial No. 14159692.4, filed Mar. 14, 2014, pursuant to 35 U.S.C. 119(a)-(d), the content of which is incorporated herein by reference in its entirety as if fully set forth herein.

BACKGROUND OF THE INVENTION

The present invention relates to a method of operation for a processing machine, especially for a machine tool.

The present invention further relates to a system program which includes machine code that is able to be executed by a numerical controller, wherein the effect of the processing of the machine code by the numerical controller is that the numerical controller executes such an operating method.

The present invention further relates to a numerical controller which is programmed with a system program of this type.

The present invention further relates to a processing machine, especially a machine tool.

The following discussion of related art is provided to assist the reader in understanding the advantages of the invention, and is not to be construed as an admission that this related art is prior art to this invention.

With processing machines—for example machine tools—the position-regulated axes are moved in a coordinated manner so that the workpiece is processed by means of the tool according to processing defined by the parts program.

Typically only the so-called TCP (=tool center point), i.e. a central point of the tool which acts on the workpiece during processing, is predetermined by means of the parts program. The real kinematics of the processing machine is not taken into account in predetermining the TCP. Because of the fact that the real kinematics of the processing machine is not known in advance within the context of establishing the parts program, no check can be made within the context of the parts program as to whether a desired processing defined by the parts program by means of the real processing machine is possible or not. In particular no check can be made as to whether, as part of the movement processes to be undertaken by the real kinematics of processing machine, the result will be undesired collisions of the tool with machine elements of the processing machine or the workpiece or undesired collisions of the machine elements with each other or with the workpiece.

To avoid such collisions virtual volumes (=protection bodies) are assigned to the tool, the workpiece and the machine elements by the numerical controller. The protection bodies can be defined—both in the prior art and also within the context of the present invention—as real volumes. As an alternative it is possible to define the protection bodies by their envelope curves. Therefore, when reference is made below to the protection bodies or the corresponding volumes, this can likewise be taken to mean the envelope curves as an alternative.

According to the real kinematics of the processing machine the protection bodies are linked. They are moved virtually by the numerical controller as part of a so-called preamble, i.e. before the real activation of the axes, in accordance with the movement to be realized. The numerical controller checks whether, within the context of this movement, the protection bodies intrude into or touch each other. If they do, the protection bodies do not remain disjoint from one another. Thus there is an unwanted collision. Otherwise the real execution of the parts program can take place.

In the parts program the setpoint position values are stored as ideal setpoint position values for an ideal processing machine. In the establishment of the parts program the assumption has therefore been made that the respective positioning of the tool relative to the workpiece corresponds entirely exactly to the predetermined setpoint values. Real processing machines exhibit deviations however. These deviations for example include offsets, zero point displacements, linear deviations and rotational deviations. Therefore a field is often stored in the numerical controller which specifies the resulting position error for the respective combination of setpoint axis values. A position error field is therefore known to the numerical controller, which specifies for any given setpoint axis values the actual position that the tool assumes relative to the workpiece when the position-regulated axes are positioned at the respective setpoint axis values. The respective position error is defined typically as a deviation from the corresponding ideal position which would be produced if the processing machine were to be constructed entirely error-free. As an alternative the actual position itself can be stored. Regardless of which method of operation is adopted, the numerical controller is capable, as a result of the position error field, of correcting the setpoint axis value accordingly, so that as a result of the TCP will be positioned correctly, i.e. in accordance with the specification by the parts program. The respective position error typically includes—both in the prior art and also within the context of the present invention—at least the (translational) positioning errors. It can additionally—both in the prior art and also within the context of the present, invention—include a (rotational) orientation error with one, two or three angles.

In the prior art the position error field is only used for correction of the real activation, but not as part of the preliminary phase for determining the positions of the protection bodies and for determining collisions resulting therefrom.

It would therefore be desirable and advantageous to obviate prior art shortcomings and to provide an improved method and system by which collisions can be reliably avoided.

SUMMARY OF THE INVENTION

According to one aspect of the present invention, an operating method for a processing machine includes
 providing to a numerical controller of the processing machine a parts program comprising a sequence of setpoint position values for a tool of the processing machine relative to a workpiece to be processed with the tool,
 determining with the numerical controller, based on the setpoint position values, a respective setpoint axis value for each position-regulated axis of a plurality of position-regulated axes operating on machine elements of the processing machine,
 associating, in the numerical controller, virtual protection bodies with the machine elements, the workpiece and the tool,
 before activating the position-regulated axes, determining with the numerical controller volumes that would be occupied by the protection bodies when the position-regulated axes are controlled in accordance with the sequence of setpoint position values and checking whether, except for the processing to be performed by the tool on the workpiece, the protection bodies remain disjoint from one another, when the protection bodies remain disjoint from one another, controlling with the numerical controller the position-regulated axes in accordance with the sequence of setpoint position values and, when the protection bodies do not remain disjoint from one another, forego controlling the position-regulated axes and performing an error response, defining in the numerical controller a position error field, which specifies for the setpoint axis values an actual position the tool relative to the workpiece when the position-regulated axes are positioned at the respective setpoint axis values, and taking the position error field into account in the numerical controller at least for a subset of the protection bodies when determining the volumes to be occupied by the protection bodies when the position-regulated axes are controlled in accordance with the sequence of setpoint position values.

In accordance with the present invention, an operating method of the type is embodied by the numerical controller taking into account the position error field at least for a part of the protection bodies in the establishment of the volumes the which would be occupied by the protection bodies on activation of the position-regulated axes in accordance with the sequence of setpoint position values.

It is possible that the numerical controller, for all protection bodies, takes into account the position error field in the establishment of the occupied volumes. Although this method of operation is entirely exact, it is however not necessary in many cases. Typically it is necessary however for those protection bodies for which the numerical controller takes into account the position error field in the establishment of the volumes occupied to include the tool and a tool holder. In a similar way it is likewise necessary typically that those protection bodies for which the numerical controller takes into account the position error field in the establishing the volumes occupied include at least the workpiece and a workpiece holder. Where necessary, other protection bodies can naturally also be included in this method of operation. In a sense of optimizing the additional effort to be made in taking into account the position error field within the context of collision checking, it is however appropriate typically for the numerical controller to only take into account the position error field in establishing the volumes occupied by these protection bodies. For the other protection bodies, the starting point in this case for establishing their respective position are the setpoint axis values directly corresponding to the setpoint position values—i.e. without taking into account the position error field.

In many processing machines, the machine elements moved by means of the position-regulated axes follow each other sequentially towards the tool or the workpiece, as seen from a resting base body of the processing machine. In this case it is often sufficient if, during the establishing of the volumes occupied by protection bodies corresponding to a specific machine element, account is only taken of the setpoint axis values of those position-regulated axes which act on machine elements which, viewed from the base body towards the tool or the workpiece, are disposed between the base body and the specific machine element. It is however likewise possible to also take into account the setpoint axis values of the further position-regulated axes. This can especially be sensible for taking into account elastic bending or the like.

The inventive method of operation can be even further optimized by the numerical controller, within the context of the establishment of the volumes occupied by the protection bodies, also taking into account a temperature dependence and/or elastic effects in addition to the position error field.

Many processing machines are embodied as three-axis machines by means of which the tool, although it is positioned translationally relative to the workpiece, cannot however be oriented rotationally. With this type of processing machine, although a translational positioning error can be corrected by a correspondingly corrected activation of the position-regulated axes, a rotational orientation error cannot be. The position error field—i.e. the description stored in the numerical controller of the deviation of the TCP from its ideal position—can also define the rotational orientation error in addition to the translational positioning error (even if said area cannot be corrected). If this is the case, the numerical controller preferably takes account, within the context of establishing the volumes occupied by the protection bodies, of the orientation error in addition to the positioning error. This allows any collision to be predicted or avoided even more precisely.

As already mentioned, the numerical controller also takes into account the position error field in the establishment of the setpoint axis values. It is possible for the numerical controller, in establishing the setpoint axis values—i.e. the real activation of the position-regulated axes—to constantly take into account the position error field. As an alternative it is possible for the numerical controller to have a control command specified to it by a user and for the numerical controller, depending on the specified control command, to take account or not take into account the position error field in establishing the setpoint axis values. Independently thereof the position error field is taken into account by the numerical controller however in both cases at least for the establishment of the volumes of the protection bodies.

According to another aspect of the present invention, a system program includes a sequence of setpoint position values for a tool of a processing machine relative to a workpiece to be processed with the tool and causes the numerical controller to execute the aforedescribed operating method.

According to yet another aspect of the present invention, a numerical controller is programmed with a system program according to the invention.

According to still another aspect of the present invention, a processing machine, especially a machine tool, includes a numerical controller programmed with a system program according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
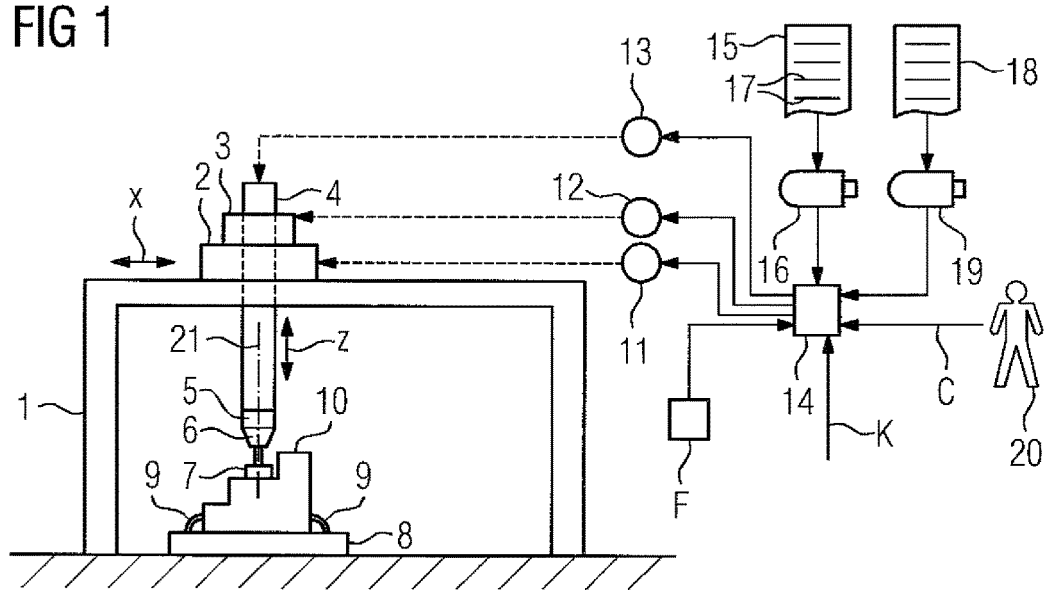
FIG. 1 shows an ideal processing machine from the side.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
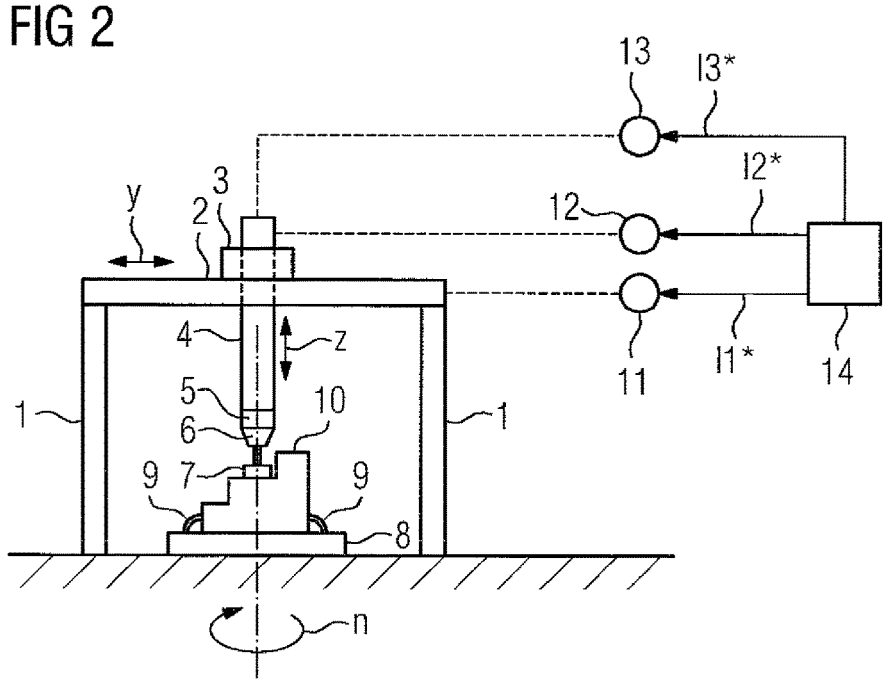
FIG. 2 shows the processing machine of FIG. 1 from the front.

Turning now to the drawing, and in particular to FIGS. 1 and 2, there is shown a processing machine, for example a machine tool, with a plurality of machine elements. The machine elements can for example involve the following elements:

- two portal supports 1, which are not moved but are always located at the same position,
- a crossrail 2, which is able to be moved linearly on the portal supports 1 in a first translational direction x,
- a support 3, which is able to be moved linearly on the crossrail 2 in a second translational direction y,
- a tool arm 4, which is able to be moved linearly in relation to the support 3 in a third translational direction z,
- a spindle drive 5, which is disposed on the end of the tool arm 4,
- a tool holder 6, which holds a tool 7 and which is regulated by means of the spindle drive 5 at a predefined rotational speed n, and
- a workpiece table 8, which is not moved but is always located at the same position, and also
- workpiece holders 9 which hold a workpiece 10.

The directions x, y, z typically define a right-angled Cartesian coordinate system. Typically one of the three directions x, y, z—in accordance with FIGS. 1 and 2 the third direction z—runs vertically. The workpiece 10 is processed by means of the tool 7.

A few of the machine elements form a base body of the processing machine which is not able to be moved. In the embodiment of the processing machine in accordance with FIGS. 1 and 2 these are for example the portal supports 1 and the workpiece table 8. Other machine elements are able to be moved under position control by means of a respective position-regulated axis 11 to 13 in relation to the base body or in relation to the position-regulated machine element on which they are disposed in relation to the base body. In the embodiment of the processing machine in accordance with FIGS. 1 and 2 these are for example the crossrail 2, the support 3 and the tool arm 4 with the spindle drive 5 disposed thereon and the further components 6, 7 driven by the spindle drive 5. Other machine elements are only able to be opened and closed, but not moved under position control for example in relation to the base body or in relation to the position-regulated machine element on which they are disposed in relation to the base body. In the embodiment of the processing machine in accordance with FIGS. 1 and 2 these are for example the tool holder 6 and the workpiece holder 9. Other machine elements are merely able to be rotated at a regulated speed in relation to the base body or in relation to the position-regulated machine element on which they are disposed in relation to the base body, but not able to be moved under position control. In the embodiment of the processing machine in accordance with FIGS. 1 and 2 the tool holder 6 and with it the tool 7 can be able to be rotated at a regulated speed by means of the spindle drive 5 for example. Depending on the position of the individual case it is however likewise possible for the spindle drive to also be able to be rotated at a regulated speed. This can for example be the case for a spindle drive which rotates the workpiece 10.

The embodiment of the processing machine in accordance with FIGS. 1 and 2 is in many respects purely by way of example. Thus the processing machine for example, as an alternative to the three-axis embodiment of FIGS. 1 and 2, could be embodied with four axes or five axes. In this case, in addition to the three translational directions x, y, z, one or two additional pivoting movements of the tool 7 relative to the workpiece 10 could be able to be realized. Even more position-regulated axes are possible. Furthermore the overall movement of the tool 7 relative to the workpiece 10 could be relocated entirely or partly to the workpiece 10. Furthermore other kinematics are also possible, for example an embodiment of the processing machine as a robot, as a tripod or as a hexapod.

The processing machine has a numerical controller 14. The numerical controller 14 is programmed with a system program 15. The system program 15 can be supplied to the numerical controller 14 via a data medium 16 for example, on which the system program 15 is stored in machine-readable form (for example in electronic form. Purely by way of example the data medium 16 is shown in FIGS. 1 and 2 as a USB memory stick. It is also possible to supply the program in other ways, for example via a link to a data network. The system program 15 is typically stored by the manufacturer of the numerical controller 14 in the numerical controller 14 and cannot be changed by a user.

The system program 15 includes machine code 17 which is able to be executed by the numerical controller. The execution of the machine code 17 by the numerical controller 14 has the effect that the numerical controller 14 executes an operating method which will be explained in greater detail below.

Figure 3:
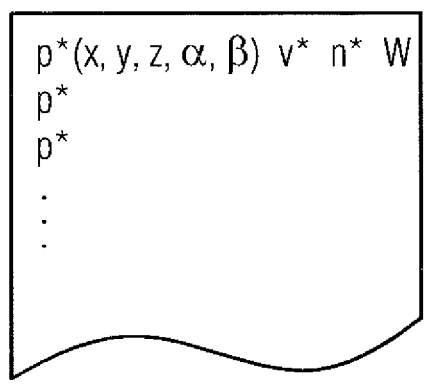
FIG. 3 shows a parts program.

The numerical controller 14 has a parts program 18 specified to it. For example in accordance with the diagram in FIGS. 1 and 2 the parts program 18 can be stored in machine-readable form on a further data medium 19 and supplied to the numerical controller via the further data medium 19. The program can also be supplied in another way, for example via a link to a data network. In accordance with FIG. 3 the parts program 18 contains a sequence of setpoint position values p*. Each setpoint position value p* defines a position which the tool 7 is to assume in relation to the workpiece 10. Each setpoint position value p* thus defines at least the position of the tool 7 relative to the workpiece 10 in the three translational directions x, y, z. For this reason the corresponding coordinates in the three directions x, y, z are specified in FIG. 3 by way of example for one of the setpoint position values p*. If necessary the setpoint position value p* can additionally include an orientation of the tool 7 relative to the workpiece 10 with up to three angles. Often the tool 7 is a rotating tool. In such a case two angles are sufficient in accordance with the diagram depicted in FIG. 3. The angles are specified in FIG. 3 for the one setpoint position value p* by $\alpha$ and $\beta$.

Often further values are assigned to the respective setpoint position value p*, such as a setpoint velocity value v*, a setpoint rotational speed value n* and/or additional information W for example. The setpoint velocity value v* specifies how quickly the tool 7 is to be moved relative to the workpiece 10 for the setpoint position value p* involved. The rotational speed value n* specifies the rotational speed at which the spindle drive 5 is to rotate the tool holder 6 and the tool 7. The additional information W can for example define which of a number of possible tools 7 is to be used.

At the beginning of the operating method the numerical controller 14 establishes for each position-regulated axis 11 to 13, on the basis of the setpoint position values V and associated setpoint axis value li* in each case (with for example i=1, 2 or 3, depending on the position-regulated axis 11 to 13 for which the respective setpoint axis value li* is determined, see FIG. 2). If the processing machine in accordance with the diagram in FIGS. 1 and 2 were ideal, the setpoint axis values li* could be established directly on the basis of the respective setpoint position value p*. In practice further certain deviations are produced. This is explained in greater detail below in conjunction with the FIGS. 4 to 6, which are greatly exaggerated presentations of the underlying problem in the present invention.

The individual machine elements 1 to 6, 8 and 9 of the processing machine are not completely ideal. If for example the crossrail 2 is moved on the portal supports 1 in the x-direction, for an ideal processing machine processing machine—as shown in FIGS. 1 and 2—a purely linear movement of the tool 7 would be produced. For a real processing machine it can occur however that the most diverse positioning errors can occur, wherein the positioning error can vary both in relation to the crossrail 2 and also in relation to the tool 7 along the position of the crossrail 2 in the x-direction. Thus for example in accordance with the diagram in FIG. 4, at a specific position in the x-direction, the right-hand portal support 1 in FIG. 4 and FIG. 5 can be slightly higher than the left-hand portal support 1 in FIGS. 4 and 5. For another position in the x-direction the two portal supports 1 can be at the same height or in accordance with the diagram in FIG. 5 even the left-hand portal support 1 can be slightly higher in FIGS. 4 and 5 than the right-hand portal support 1 in FIGS. 4 and 5. Other incorrect positions are also possible.

It can readily be seen that in such a case those machine elements which are moved by means of the crossrail 2 will likewise be incorrectly positioned. Thus for example the error explained above leads to the tool 7, in the situation shown in FIG. 4, viewed in the y-direction, being deflected to the right, in the situation depicted in FIG. 5, being deflected to the left. Furthermore the orientation of the tool 7 changes relative to the workpiece 10.

Therefore as a result a deviation—even if small in practice—of the movement of the crossrail 2 in relation to the position of the tool 7 relative to the workpiece 10 can cause an error in all three directions x, y, z and also an error in the orientation of the tool 7 relative to the workpiece 10.

Figure 4:
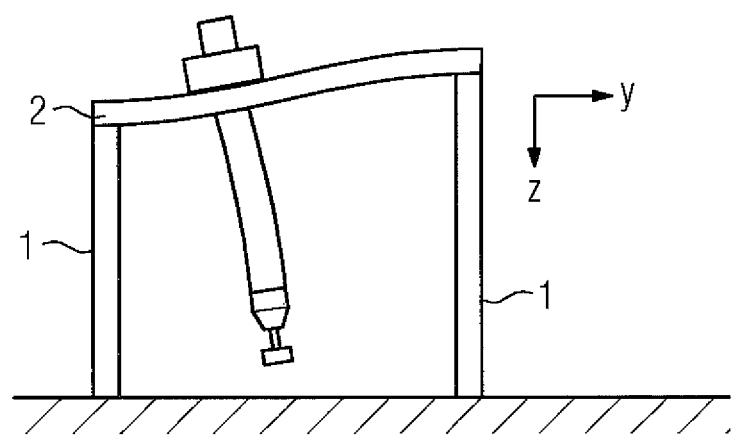
FIGS. 4 and 5 show a real processing machine from the front.
Figure 5:
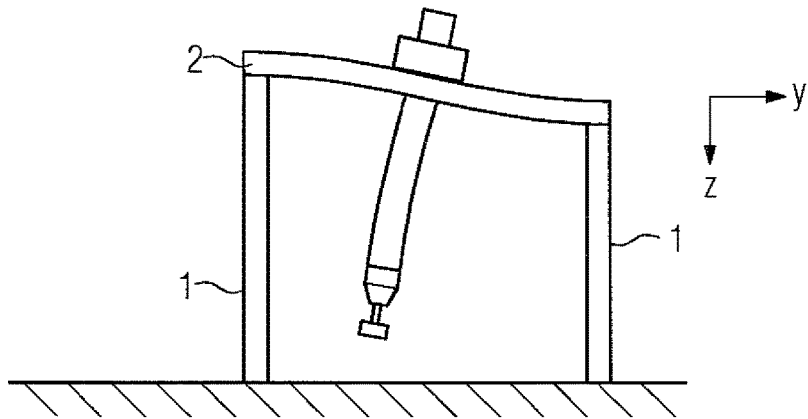

In a similar manner for example the crossrail 2, in accordance with the diagram in FIGS. 4 and 5, can be slightly bent. Here too this deviation of the crossrail 2 from its ideal form leads to a positioning error of the tool 7 occurring while the support 3 is moved in the y-direction. Here too a deviation—even if only small in practice—of the movement of the support 3 in relation to the position of the tool 7 relative to the workpiece 10 can cause an error in all three directions x, y, z and also an error in the orientation of the tool 7 relative to the workpiece 10. Similar observations apply for other machine elements moved by means of the position-regulated axes 11 to 13, for example the tool arm 4.

In order to be able to correct these types of positioning error, a position error field F is known to the numerical controller 14 in accordance with FIG. 1. The position error field F contains for any given combinations of setpoint axis values li* (or at least for sufficiently many combinations so that interpolation is possible for intermediate values) the respective corresponding position error F(li*).

It can be possible, with the given setpoint position value V and known position error field F, to establish the setpoint axis values li* directly, for which the corresponding position error F(li*) is corrected. In this case however a method of operation is possible for establishing the setpoint axis values li* as will be explained below in conjunction with FIG. 6.

Figure 6:
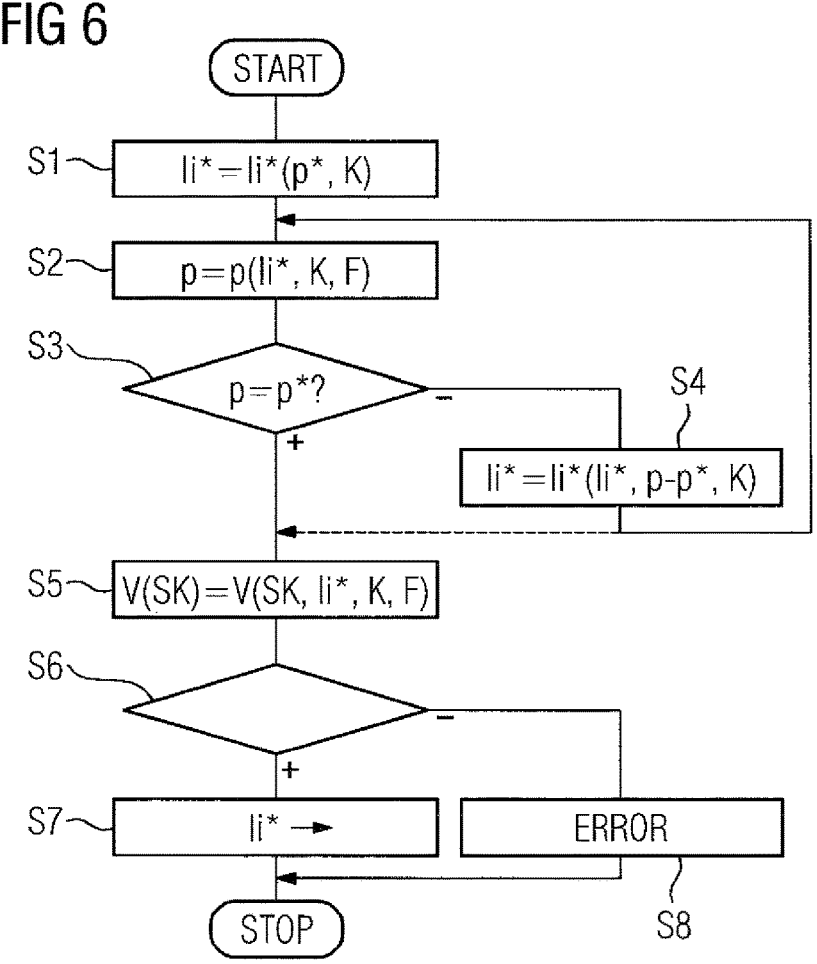
FIG. 6 shows a flow diagram.

In accordance with FIG. 6 the numerical controller 14 initially establishes, in a step S1, on the basis of the setpoint position values p* and the (naturally known to the numerical controller 14) ideal kinematics K of the processing machine, the respective setpoint axis values li*. In a step S2 the numerical controller 14 establishes on the basis of the just established setpoint axis values li*, of the kinematics K and the position error field F, the actual position values p produced in each case. The respective actual position value p—like the setpoint position values p*—at least in the three translational directions x, y, z has a coordinate in each case. The respective actual position value p can furthermore—here too like the setpoint position values p*—include up to three angles.

In a step S3 the numerical controller 14 checks whether the actual position values p established in step S2 match the associated setpoint position values p* (within permissible, predefined tolerances). If they do not, the numerical controller 14 goes to a step S4. In step S4 the numerical controller 14, starting from the setpoint axis values li*, establishes from the deviation of the actual position values p from the setpoint position values p* and the kinematics K of the processing machine, new, modified setpoint axis values li*. Then the numerical controller 14 returns to step S2. Otherwise, if the established actual position values p thus match the associated setpoint position values p*, the establishing of the setpoint axis values li* is ended.

As part of the method of operation explained above in conjunction with FIG. 6 the setpoint axis values li* are determined iteratively. It can however be possible under some circumstances in accordance with the variant shown by dashed lines in FIG. 6 to only cored the setpoint axis values li* once. In this case the numerical controller 14 goes directly from step S4 to a step S5.

In principle, because of the establishment of the correct setpoint axis values li*, the activation of the position-regulated axes 11 to 13 by the numerical controller 14 would now be possible. Were this now to be undertaken however there would be a danger of collisions. In particular the tool 7 could collide with machine elements 1 to 3, 8, 9 or (in the case of contact processing, for example metal-removal processing, naturally with the exception of the location of the workpiece 10 which is to be processed by the tool 7) with the workpiece 10. Likewise a moving machine element 2 to 6 could collide with another machine element 1 to 6, 8, 9 or the workpiece 10.

Figure 7:
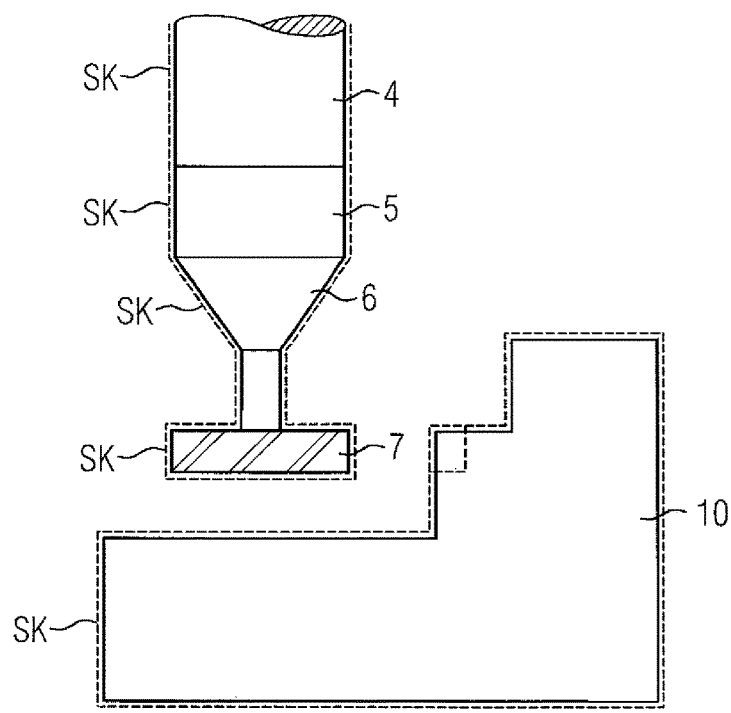
FIG. 7 shows machine elements, a tool and a workpiece as well as associated protection bodies.

To exclude the danger of such collisions or at least keep it as low as possible, the machine elements 1 to 6, 8, 9, the workpiece 10 and the tool 7 are assigned virtual protection bodies SK within the numerical controller 14. The protection bodies SK are shown by way of example in FIG. 7 for the section of the tool arm 4 adjoining the spindle drive 5, the spindle drive 5, the tool holder 6, the tool 7 and the workpiece 10 by dashed lines. The protection bodies SK are defined so that they match the assigned machine elements 1 to 6, 8, 9, the workpiece 10 and the tool 7 as well as possible.

Figure 8:
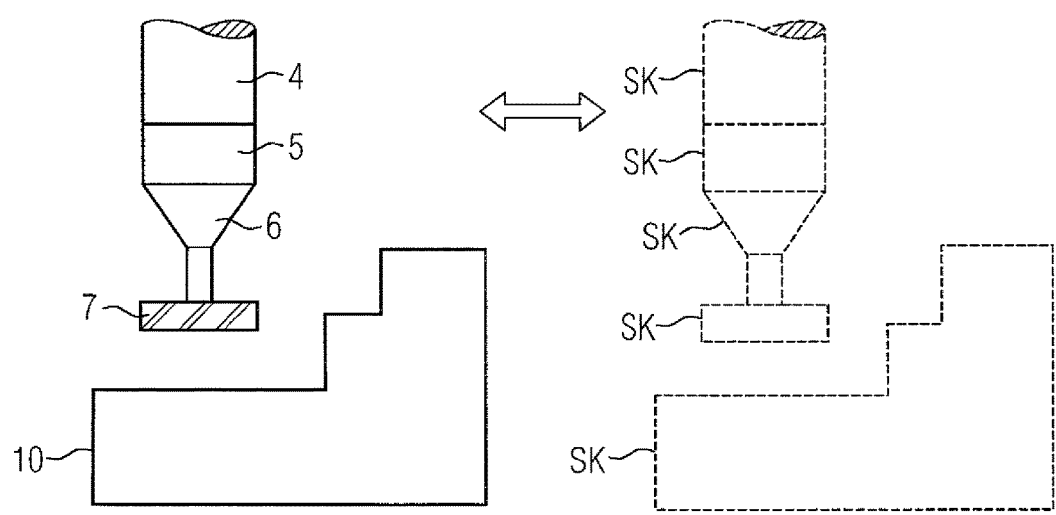
FIG. 8 shows a numerical controller and a virtual processing machine.

When the setpoint axis values li* are established, the numerical controller 14, as already explained, goes to step S5. In step S5 the numerical controller 14 establishes volumes V. In particular the numerical controller 14 in step S5 establishes, for each combination of setpoint axis values li* determined for a specific setpoint position value p*, the volumes V which are occupied by the protection bodies SK in each case if the position-regulated axes 11 to 13 were to be activated in accordance with the sequence of setpoint position values p* (or the corresponding sequences of setpoint axis values li*). The protection bodies SK thus so to speak, in accordance with the diagram depicted in FIG. 8, form a virtual map of the processing machine and are moved virtually.

In step S5 the numerical controller 14 also takes account, in establishing the volumes V—at least for a part of the protection bodies SK—of the position error field F in addition to the setpoint axis values li*. Provided the numerical controller 14 takes into account the position error field F, the numerical controller 14 establishes as part of step S5 for the respective protection bodies SK the correct volume V, i.e. especially its location and position. The numerical controller 14 thus takes account for example of the fact that—see for example FIG. 4—the crossrail 2, seen in the z-direction, is not exactly above the tool 7, but is running at an angle. Thus in the establishment of the corresponding volume V it is not only taken into account that, as a result of the deviations of the real processing machine from the ideal processing machine, the setpoint axis values li* as such have other values. Instead the cause of the deviating setpoint axis values li* is also taken into account, thus for example the mispositioning of the tool arm 4 as a result of one side of the crossrail 2 being raised. Similar observations apply to the other protection bodies SK.

In a step S6 the numerical controller 14 checks whether the protection bodies SK, within the context of the movement simulated by means of step S5, remain disjoint from one another. An exception here is formed in the case of contact-based processing, for example metal-removal processing, by the (desired) processing of the workpiece 10 by the tool 7. At this point a contact between the protection bodies SK assigned to the tool 7 with the protection bodies SK assigned to the workpiece 10 is permitted. The location of the workpiece 10 at which the contact is permitted can vary over time. Furthermore especially the protection bodies SK assigned to the workpiece 10 can vary over time in accordance with the processing by the tool 7.

Depending on the result of the test of step S6 the numerical controller 14 goes to a step S7 or to a step S8. The step S7 is executed if the protection bodies SK remain disjoint from one another. In this case the numerical controller 14 activates the position-regulated axes 11 to 13 in accordance with the sequence of setpoint position values p*, more precisely in accordance with the sequence of established setpoint axis values li*. The step S8 is executed if the protection bodies SK do not remain disjoint from one another. In this case the activation of the position-regulated axes 11 to 13 is suppressed by the numerical controller 14. Furthermore an error response is executed, for example an error message is output to an operator 20 (see FIG. 1).

It is possible to carry out the inventive method—i.e. the method according to FIG. 6—with the inventive embodiment of the step S5—for all protection bodies SK. In many cases however only the tool 7, the workpiece 10 and machine elements adjoining the tool 7 and the workpiece 10 are critical. Within the context of the present invention, critical means that on the one hand, within the context of the processing of the workpiece 10 by the tool 7, the option exists of the corresponding elements having to be moved very close to one another, but still not being allowed to collide with one another. With these elements a highly-exact modeling of the real processing machine and of the real workpiece 10 by the corresponding protection bodies SK and the volumes V occupied in each case by the corresponding protection bodies SK is necessary. The protection bodies SK, for which the numerical controller 14 takes into account the position error field F in establishing the volumes V occupied, should therefore comprise, on the tool 7 side, at least the protection bodies SK for the tool 7 and the tool holder 6. If the tool 7 is a rotating tool (for example a drill or a milling tool), the same method of operation can also be adopted for the protection bodies SK for the spindle drive 5. Furthermore the protection bodies SK for which the numerical controller 14 takes into account the position error field F in establishing the volumes V occupied, includes on the workpiece 10 side at least the protection bodies SK for the workpiece 10 and the workpiece holder or holders 9.

For all other machine elements—in the event of the processing machine being designed in accordance with the explanations for FIGS. 1 and 2, for example the portal supports 1, the crossrail 2 and the support 3—there is often not the requirement in advance to bring the corresponding elements into the immediate vicinity of other elements. In this case, the danger of collisions can actually likewise be excluded by the inventive highly-exact modeling. With the other machine elements it is however alternatively likewise possible (and typically is to be preferred for reasons of simpler and faster calculation) for the numerical controller 14 not to take into account the position error field F for the protection bodies SK assigned to these machine elements. The position error field F is thus preferably only taken into account for the protection bodies SK which are assigned to the aforementioned machine elements 5, 6, 9, to the tool 7 and to the workpiece 10.

Within the context of the method of operation explained above in conjunction with FIG. 6 the numerical controller 14 takes into account the position error field F both in the establishment of the setpoint axis values li* and also in the establishment of the volumes V occupied by the protection bodies SK. This method of operation is to be preferred typically. It is however possible for the operator 20 of the numerical controller 14 to specify a control command C in accordance with the diagram in FIG. 1. The control command C can assume (at least) two different values. If this embodiment is realized the method of operation of FIG. 6 is modified in accordance with the diagram in FIG. 9.

Figure 9:
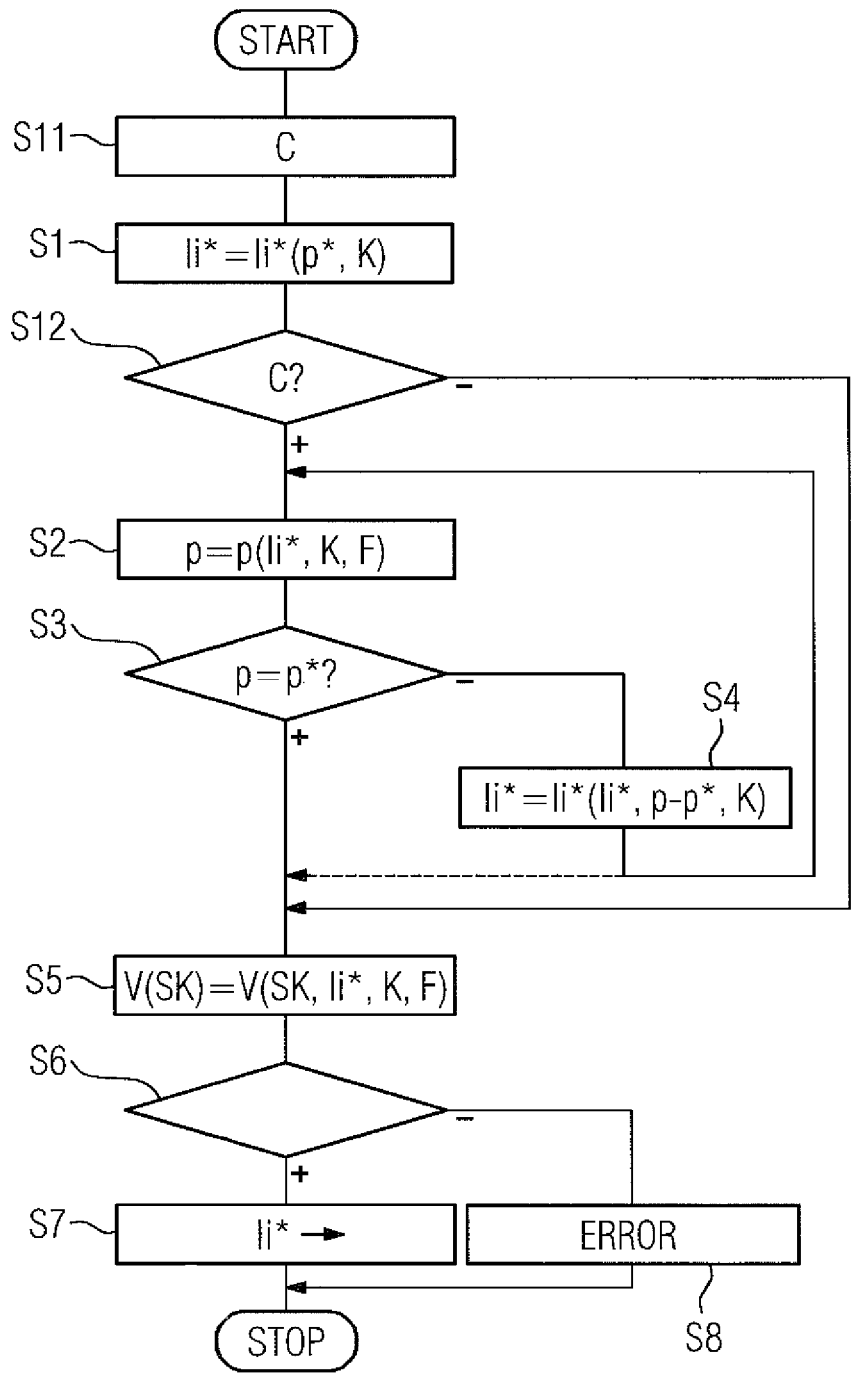
FIG. 9 shows a flow diagram and FIG. 10 shows a section of a position error field.

FIG. 9 includes the steps S1 to S8 of FIG. 6. Therefore no further information is required for steps S1 to S8. In addition FIG. 9 includes steps S11 and S12. In step S11 the numerical controller 14 accepts the control command C from the operator 20. In step S12 the numerical controller 14 checks which value the control command C has. Depending on the value of the control command C, the numerical controller 14 either moves to step S2 or skips the iteration loop consisting of the steps S2 to S4. In the latter case the numerical controller 14 thus, starting from step S12, moves directly to step S5. As a result the numerical controller 14 thus takes account in the establishment of the setpoint axis values li* in one case of the position error field F and in the other case does not take into account the position error field F. In both cases however in the establishment of the volumes V occupied by the protection bodies SK the inventive method of operation of step S5 is adopted.

In many processing machines—see the remarks relating to FIGS. 1 and 2—seen from an idle base body of the processing machine, the machine elements 2 to 4 moved by means of the position-regulated axes 11 to 13 follow each other sequentially towards the tool 7. The effect of moving the crossrail 2 for example, as explained above in conjunction with FIGS. 1 and 2, is at the same time a changed positioning of the subsequent machine elements 3 to 6 and of the tool 7. In a similar manner the effect of moving the support 3 is at the same time also a changed positioning of the subsequent machine elements 4 to 6 and of the tool 7, but not a changed positioning of the crossrail 2. The same can be said for the tool arm 4. The same can also be said in relation to the workpiece 10, provided the workpiece 10 is moved sequentially over a number of position-regulated axes.

If the machine elements 1 to 6, 8, 9 are embodied sufficiently stiff, it is possible, in the establishment of the volume V occupied by one of the respective protection bodies SK, only to take into account the setpoint axis values li* of the upstream position-regulated axes 11 to 13. It is thus possible to only take into account the setpoint axis values li* of those position-regulated axes 11 to 13 which act on machine elements 1 to 6, 8, 9 which, viewed from the base body towards the tool 7 or towards the workpiece 10, are disposed between the base body and the specific machine element 3, 4. In the exemplary embodiment of the processing machine in accordance with FIGS. 1 and 2 it is thus possible, in the establishment of the volume V which is occupied by protection bodies SK assigned to the crossrail 2, to take account exclusively of the respective setpoint axis value l1* for the position-regulated axis 11 by means of which the crossrail 2 is moved. In a similar way it is possible, in the establishment of the volume V which is occupied by the protection bodies SK assigned to the support 3, to take account exclusively of the setpoint axis values l1*, l2* for the position-regulated axes 11 and 12, by means of which the crossrail 2 and the support 3 are moved. In the establishment of the volume V which is occupied by the protection bodies SK assigned to the tool arm 4 on the other hand the setpoint axis values li* for all three position-regulated axes 11 to 13 must be taken into account.

As an alternative the case can also occur that the machine elements 1 to 6, 8, 9, or a few of these machine elements cannot be assumed to be completely stiff. In this case the numerical controller 14, within the context of establishing the volumes V occupied by the protection bodies SK preferably takes account, in addition to the position error field F, also of the elastic effects, for example as a result of bending moments. The extent of an elastic deformation of a specific machine element is typically (at least inter alia) also dependent on the positioning of downstream machine elements. In this case therefore typically the method of operation is not adopted of only taking into account, in the establishing of the volumes V occupied by one of the respective protection bodies SK, the setpoint axis values li* of the upstream position-regulated axes 11 to 13. As an alternative or in addition to taking into account elastic effects, it is further possible to take into account a temperature dependency as well.

FIG. 5 additionally shows a further problem. In the diagram in FIG. 5 it is assumed—as the only difference from FIGS. 1, 2 and 4—that in addition to the translational position, the rotational orientation of the tool 7 relative to the workpiece 10 can also be set. If for example—see FIG. 1—an axis of rotation 21 of the spindle drive 5 is to be oriented in parallel to the z-axis, then this orientation can also be adopted when the above-mentioned positioning errors occur. The correction of the orientation is possible with a five-axis machine but not with a three-axis machine in which (in the ideal case) only the three translational directions x, y, z can be set.

Figure 10:

This case is considered below, i.e. that the processing machine is embodied as a three-axis machine by means of which the tool 7, although it can be translationally positioned relative to the workpiece 10, cannot however be rotationally oriented. In this case it is possible for the position error field F to exclusively define a translational positioning error δp. A rotational orientation error δo can actually be defined by the position error field F in this case, however it cannot be corrected. It is possible for example for the position error field F according to the diagram shown in FIG. 10, explicitly in addition to the positioning error δp to include the orientation error δo. As an alternative the orientation error δo can be able to be determined on the basis of the graphs of the positioning error δp as a function of the setpoint axis values li*. Regardless of which of these cases exists, it is possible for the numerical controller 14, within the context of the establishment of the volumes V occupied by the protection bodies SK, to also take into account the orientation error δo in addition to the positioning error.

Typically the setpoint axis values li* represent input variables of the position error field F, the positioning error δp and if necessary also of the orientation error δo represent output variables. In principle however an inverse use of the position error field F is likewise, possible.

In summary the present invention thus includes the following subject matter:

A parts program 18, which has a sequence of setpoint position values p* for a tool 7 of the processing machine relative to a workpiece 10 to be processed, is specified to a numerical controller 14 of a processing machine. The numerical controller 14 establishes on the basis of the setpoint position values p* for position-regulated axes 11 to 13 of the processing machine acting on machine elements 2 to 4 of the processing machine, a setpoint axis value li* in each case. The machine elements 1 to 6, 8, 9, the workpiece 10 and the tool 7 are assigned virtual protection bodies SK within the numerical controller 14. The numerical controller 14 establishes, before activating the position-regulated axes 11 to 13, volumes V which are occupied by the protection bodies SK on activation of the position-regulated axes 11 to 13 and checks whether the protection bodies SK remain disjoint from one another here. Depending on the result of the checks the numerical controller 14 activates the position-regulated axes 11 to 13 in accordance with the setpoint position values p* or suppresses the activation and executes an error response. A position error field F is known to the numerical controller, which for any given setpoint axis values li*, specifies which actual position p the tool 7 assumes relative to the workpiece 10 in each case. The numerical controller 14, at least for a part of the protection bodies SK, takes into account the position error field F in the establishing of the volumes V which would be occupied by the protection bodies SK on activation of the position-regulated axes 11 to 13 in accordance with the setpoint position values p*.

The present invention has many advantages. In particular a superior, highly-accurate modeling of the movement of the machine elements 1 to 6, 8, 9, of the tool 7 and of the workpiece 10 and thus also a highly-accurate collision monitoring within the context of the so-called preamble is possible.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An operating method for a processing machine, comprising:
   providing to a numerical controller of the processing machine a parts program comprising a sequence of setpoint position values for a tool of the processing machine relative to a workpiece to be processed with the tool,
   programming the numerical controller with a system program supplied to the numerical controller via an external non-transitory computer readable data medium, said non-transitory computer readable data medium being provided as an external USB memory stick,
   determining with the numerical controller, based on the setpoint position values, a respective setpoint axis value for each position-regulated axis of a plurality of position-regulated axes operating on machine elements of the processing machine,
   associating, in the numerical controller, virtual protection bodies with the machine elements, the workpiece and the tool, the virtual protection bodies being defined by envelope curves,
   before activating the position-regulated axes, determining volumes with the numerical controller that are occupied by the virtual protection bodies when the position-regulated axes are controlled in accordance with the sequence of setpoint position values and checking whether, except for the processing to be performed by the tool on the workpiece, the virtual protection bodies remain disjoint from one another,
   when the virtual protection bodies remain disjoint from one another, controlling with the numerical controller the position-regulated axes in accordance with the sequence of setpoint position values and, when the virtual protection bodies do not remain disjoint from one another, foregoing controlling the position-regulated axes and performing an error response,
   defining in the numerical controller a position error field, which specifies for the setpoint axis values an actual position that the tool assumes relative to the workpiece when the position-regulated axes are positioned at the respective setpoint axis values, and which also takes into account the elasticities of the tool and the workpiece, and
   taking the position error field into account in the numerical controller at least for a subset of the virtual protection bodies when determining the volumes to be occupied by the virtual protection bodies when the position-regulated axes are controlled in accordance with the sequence of setpoint position values, wherein the virtual protection bodies, for which the numerical controller takes into account the position error field when determining the occupied volumes, comprise at least the tool and a tool holder.

2. The operating method of claim 1, wherein the virtual protection bodies, for which the numerical controller takes into account the position error field when determining the occupied volumes, comprise at least the tool and a workpiece holder.

3. The operating method of claim 1, wherein the numerical controller takes of the position error field into account only when determining the occupied volumes of the virtual protection bodies that comprise at least the tool and one of a tool holder and a workpiece holder.

4. The operating method of claim 1, wherein the machine elements moved by the position-regulated axes are arranged sequentially as viewed from a base body of the processing machine towards the tool or the workpiece, wherein when determining the volumes occupied by one of the virtual protection bodies corresponding to a specific machine element only the setpoint axis values of those position-regulated axes are taken into account that operate on the sequentially arranged machine elements disposed between the base body and the specific machine element.

5. The operating method of claim 1, further comprising taking into account with the controller at last one of a temperature dependency and an elastic effect in addition to the position error field when determining the volumes occupied by the virtual protection bodies.

6. The operating method of claim 1, wherein the processing machine is constructed as a three-axis machine capable of positioning the tool translationally but not orienting the tool rotationally, wherein the position error field defines a rotational orientation error in addition to a translational positioning error, and wherein the numerical controller takes into account the orientation error in addition to the positioning error when defining the volumes occupied by the virtual protection bodies.

7. The operating method of claim 1, wherein the numerical controller takes into account the position error field when defining the setpoint axis values.

8. The operating method of claim 1, further comprising receiving in the numerical controller a control command defined by a user input, with the control command specifying whether or not the numerical controller takes account the position error field when establishing the setpoint axis values.

9. The operating method of claim 1, wherein the processing machine is a machine tool.

10. A system program embodied in a non-transitory computer-readable medium and comprising machine code representing a parts program comprising a sequence of setpoint position values for a tool of a processing machine relative to a workpiece to be processed with the tool, wherein the system program is loaded into a memory of a numerical controller, said numerical controller being programmed with the system program supplied to the numerical controller via an external non-transitory computer readable data medium, said non-transitory computer readable data medium being provided as an external USB memory stick and when the system program is processed by the numerical controller, the system program causes the numerical controller to:
   determine, based on the setpoint position values, a respective setpoint axis value for each position-regulated axis of a plurality of position-regulated axes operating on machine elements of the processing machine, associate virtual protection bodies with the machine elements, the workpiece and the tool, the virtual protection bodies being defined by envelope curves, before activating the position-regulated axes, determine volumes that would be occupied by the virtual protection bodies when the position-regulated axes are controlled in accordance with the sequence of setpoint position values and check whether, except for the processing to be performed by the tool on the workpiece, the virtual protection bodies remain disjoint from one another, when the virtual protection bodies remain disjoint from one another, control the position-regulated axes in accordance with the sequence of setpoint position values and, when the virtual protection bodies do not remain disjoint from one another, forego controlling the position-regulated axes and performing an error response, define a position error field, which specifies for the setpoint axis values an actual position that the tool assumes relative to the workpiece when the position-regulated axes are positioned at the respective setpoint axis values, and which also takes into account the elasticities of the tool and the workpiece, and take the position error field into account at least for a subset of the virtual protection bodies when determining the volumes to be occupied by the virtual protection bodies when the position-regulated axes are controlled in accordance with the sequence of setpoint position values, wherein the virtual protection bodies, for which the numerical controller takes into account the position error field when determining the occupied volumes, comprise at least the tool and a tool holder.

11. A numerical controller of a processing machine, comprising a parts program comprising a sequence of setpoint position values for a tool of the processing machine relative to a workpiece to be processed with the tool, said numerical controller being programmed with a system program supplied to the numerical controller via an external non-transitory computer readable data medium, said non-transitory computer readable data medium being provided as an external USB memory stick, wherein the numerical controller is configured to:

determine, based on the setpoint position values, a respective setpoint axis value for each position-regulated axis of a plurality of position-regulated axes operating on machine elements of the processing machine, associate virtual protection bodies with the machine elements, the workpiece and the tool, the virtual protection bodies being defined by envelope curves, before activating the position-regulated axes, determine volumes that would be occupied by the virtual protection bodies when the position-regulated axes are controlled in accordance with the sequence of setpoint position values and check whether, except for the processing to be performed by the tool on the workpiece, the virtual protection bodies remain disjoint from one another, when the virtual protection bodies remain disjoint from one another, control the position-regulated axes in accordance with the sequence of setpoint position values and, when the virtual protection bodies do not remain disjoint from one another, forego controlling the position-regulated axes and performing an error response, define a position error field, which specifies for the setpoint axis values an actual position that the tool assumes relative to the workpiece when the position-regulated axes are positioned at the respective setpoint axis values, and which also takes into account the elasticities of the tool and the workpiece, and take the position error field into account at least for a subset of the virtual protection bodies when determining the volumes to be occupied by the virtual protection bodies when the position-regulated axes are controlled in accordance with the sequence of setpoint position values, wherein the virtual protection bodies, for which the numerical controller takes into account the position error field when determining the occupied volumes, comprise at least the tool and a tool holder.

12. A processing machine, comprising:

a plurality of machine elements, a plurality of position-regulated axes configured to move a subset of the machine elements under position control, a numerical controller controlling movement of the position-regulated axes, wherein the numerical controller comprises a parts program comprising a sequence of setpoint position values for a tool of the processing machine relative to a workpiece to be processed with the tool, said numerical controller being programmed with a system program supplied to the numerical controller via an external non-transitory computer readable data medium, said non-transitory computer readable data medium being provided as an external USB memory stick and is configured to:

determine, based on the setpoint position values, a respective setpoint axis value for each position-regulated axis of a plurality of position-regulated axes operating on machine elements of the processing machine, associate virtual protection bodies with the machine elements, the workpiece and the tool, the virtual protection bodies being defined by envelope curves, before activating the position-regulated axes, determine volumes that would be occupied by the virtual protection bodies when the position-regulated axes are controlled in accordance with the sequence of setpoint position values and check whether, except for the processing to be performed by the tool on the workpiece, the virtual protection bodies remain disjoint from one another, when the virtual protection bodies remain disjoint from one another, control the position-regulated axes in accordance with the sequence of setpoint position values and, when the virtual protection bodies do not remain disjoint from one another, forego controlling the position-regulated axes and performing an error response, define a position error field, which specifies for the setpoint axis values an actual position that the tool assumes relative to the workpiece when the position-regulated axes are positioned at the respective setpoint axis values, and which also takes into account the elasticities of the tool and the workpiece, and take the position error field into account at least for a subset of the virtual protection bodies when determining the volumes to be occupied by the virtual protection bodies when the position-regulated axes are controlled in accordance with the sequence of setpoint position values, wherein the virtual protection bodies, for which the numerical controller takes into account the position error field when determining the occupied volumes, comprise at least the tool and a tool holder.

13. The processing machine of claim 12, wherein the processing machine is a machine tool.

\* \* \* \* \*